United States Patent

Greene

(10) Patent No.: US 8,024,080 B2
(45) Date of Patent: Sep. 20, 2011

(54) AUTOMATED THROTTLE CONTROL SYSTEM

(75) Inventor: Leonard M. Greene, New York, NY (US); Richard A. Sporn, legal representative, New York, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 669 days.

(21) Appl. No.: 12/146,616

(22) Filed: Jun. 26, 2008

(65) Prior Publication Data

US 2009/0326743 A1    Dec. 31, 2009

(51) Int. Cl.
*B64C 13/00* (2006.01)
*G05D 1/08* (2006.01)

(52) U.S. Cl. ............................. 701/5; 701/10; 244/76 R

(58) Field of Classification Search ........................ None
See application file for complete search history.

(56) References Cited

U.S. PATENT DOCUMENTS

| | | | |
|---|---|---|---|
| 3,486,722 A | 12/1969 | Greene | |
| 4,422,147 A * | 12/1983 | Hanke | 701/121 |
| 4,651,954 A * | 3/1987 | Miller | 244/76 R |
| 4,912,642 A * | 3/1990 | Larsen et al. | 701/99 |
| 5,079,711 A | 1/1992 | Lambregts et al. | |
| 6,819,266 B2 | 11/2004 | Greene | |
| 2008/0099628 A1 * | 5/2008 | Greene | 244/191 |

* cited by examiner

*Primary Examiner* — Michael J. Zanelli
(74) *Attorney, Agent, or Firm* — Morrison & Foerster LLP

(57) ABSTRACT

A throttle control system that is compensated for mountain wave conditions includes an auto throttle computer and a detector for detecting the pitch or pitch angle of the aircraft. The computer is used for determining the rate of change of pitch i.e. the first derivative of pitch angle and the rate of change of the rate of change of pitch i.e. the second derivative for generating a signal indicative of the rate of change of the rate of change of pitch. The signal from the auto throttle computer is combined with the signal from the signal indicative of the second derivative to produce a combined signal which is fed to a servo assemble and motor for adjusting the throttle of an aircraft.

6 Claims, 2 Drawing Sheets

AUTOMATED THROTTLE CONTROL SYSTEM

FIELD OF THE INVENTION

This invention relates to an automated throttle control system for aircraft and more particularly to a mountain wave compensated automatic control system.

BACKGROUND FOR THE INVENTION

Instruments which automatically control the engine throttle and supply an indication for control thereof are well known. For example, one of my earlier patents, U.S. Pat. No. 3,486,722 discloses a system wherein the control of the throttle is a function of the combination of two signals. One signal is that of acceleration independent of pitch attitude of the airplane and the other signal is the higher of two alternative signals. The first alternative signal being the airspeed of the aircraft and the second alternative signal being the lift of the aircraft. Both the first and the second alternative signals are deviation signals representing the difference in the first instance between the actual airspeed and a pilot pre-selected airspeed or reference speed and of the second incidence between the actual lift and a pilot un-alterable pre-selected lift that takes flap position into account. The selection between the two alternative signals is performed automatically and not under a pilot's control.

A more recent patent of Lambregts et al. U.S. Pat. No. 5,079,711 discloses an aircraft high altitude vertical flight path and speed control system. As disclosed therein, a variable bandwidth factor KALT is applied in a total energy control system to obtain a reduction in throttle activity while maintaining system stability. The system has a total energy load control loop and an energy distribution control loop. In the former, a net thrust command signal $T_c$ is generated to reduce the total energy error to zero. In the latter, an elevator position command signal $Se_c$ is generated to reduce the energy rate distribution error, i.e. correct the distribution of energy between kinetic energy (speed) and potential energy (altitude). The error signal input into each loop has a flight path component and a speed component. The factor KALT is applied to both components of the total energy error to reduce the bandwidth of the total energy error loop with increasing altitude and thereby reduce throttle activity. The factor KALT is also applied to one of the components of the energy distribution error to prioritize reduction of that component to zero by control of the elevator position. Preferably, speed control is prioritized, and energy errors are channeled into short term deviations in altitude.

The prior art systems are effective under many circumstances but have not been found to be effective in compensating for mountain waves. Mountain waves or orographic waves occur frequently over mountain areas, as for example, along the East coast of the United States as a result of strong westerly wind flow conditions. Further, under suitable conditions mountain waves have an influence up through the atmosphere. A problem in using auto throttle systems when encountering mountain waves is that they tend to hunt and peck and result in frequent increases and decreases in throttle to provide a rough or choppy ride for the passengers.

It is now believed that an auto throttle system in accordance with the present invention will anticipate changes in throttle and smooth out the flight. Advantageously such systems may be incorporated in conventional automatic throttle control systems without adversely affecting the operation of such systems. The automatic throttle control systems with mountain wave compensation, also utilize the same inputs and outputs as conventional systems and can be added to systems at a relatively small cost. Such systems are reliable, durable and easily serviced and may be incorporated as a computer program.

BRIEF SUMMARY OF THE INVENTION

In essence the present invention contemplates an automatic control system with mountain wave compensation. The system includes an auto throttle control including a computer for generating a first signal for automatically controlling the thrust of an aircraft engine and means for determining the pitch of the aircraft. The system also includes means for determining the first and second derivatives of pitch and for generating a signal indicative of the second derivative of the pitch of the aircraft. Further, the throttle control system as disclosed herein includes means for combining the first and second signals to produce a combined signal and means for adjusting the throttle of the aircraft engines in response to the combined signal.

The invention will now be described in connection with the accompanying drawings wherein like reference numerals have been used to indicate like parts.

DESCRIPTION OF THE PREFERRED EMBODIMENTS OF THE INVENTION

Figure 1:
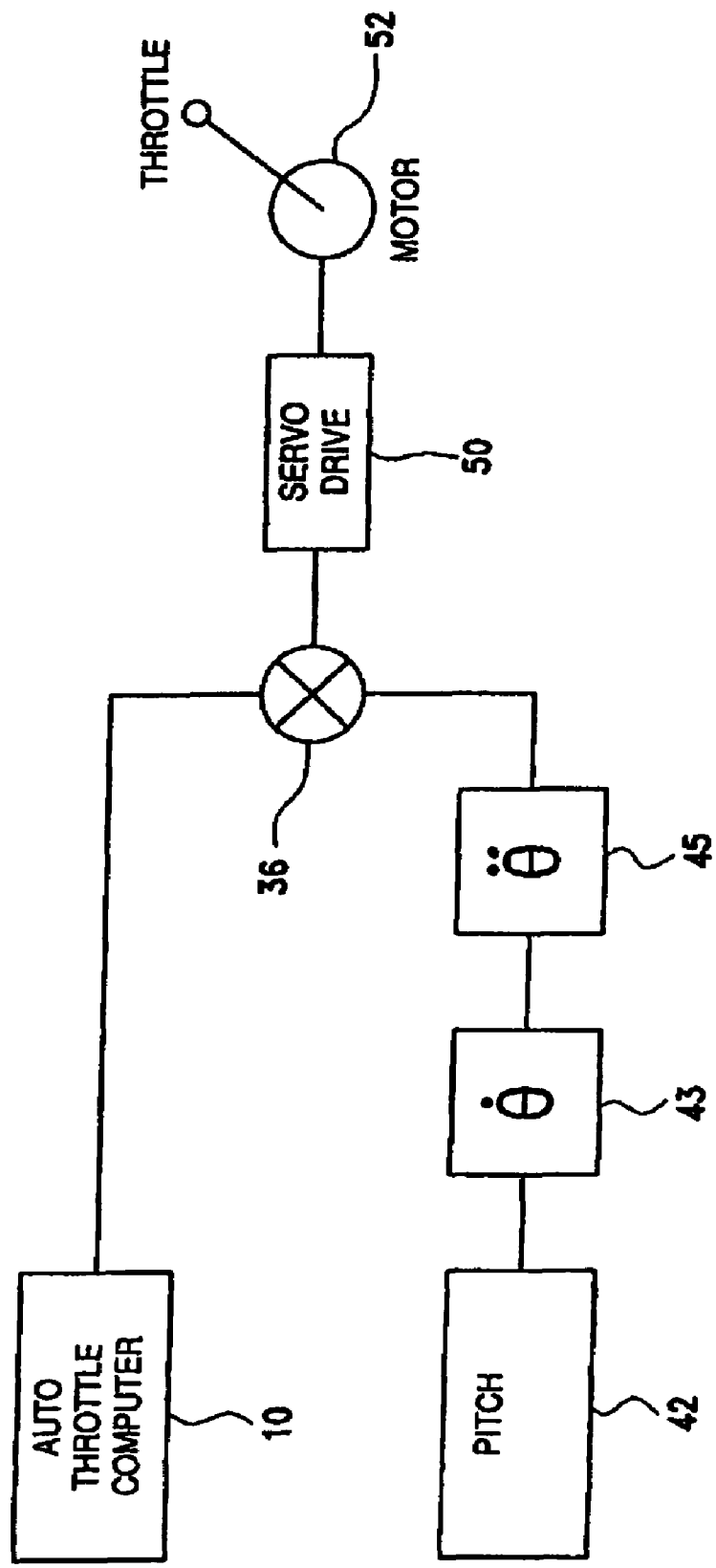
FIG. 1 is a schematic block diagram which illustrates a first embodiment of the invention.

As illustrated in FIG. 1, an automatic throttle control system with mountain wave compensation includes a conventional auto throttle computer or speed control system for an aircraft. The basic auto throttle 10 for use in the present invention may be of conventional design such as Safe Flight Autopower™ airspeed select system. Such systems include four main components, an Autopower computer, a clutch pack, a set of yoke-mounted increase/decrease switches and a digital IAS target display. An auto power engine switch cockpit annunciater and circuit breakers are also provided. The auto throttle computer contains the electronics necessary for the operation of the system while the clutch pack contains one clutch per throttle and a servo drive motor assembly for each engine.

In the present invention, the auto throttle 10 produces a signal which is fed to a summing junction 36. In addition, a pitch indicator 42 of conventional design generates a signal while a computer calculates the first derivative 43 that is the rate of change on the pitch angle. In box 45 the computer (not shown) generates a signal indicative of the rate of change of the rate of change of the pitch angle or second derivative and feeds the signal to the summing circuit 36. The signals from the auto throttle computer and the second derivative of pitch are combined in the summing circuit 36 and fed to a servo drive 50. The servo drive 50 then activates a motor 52 to increase or retard a throttle in accordance with the compensated auto throttle to smooth out the changes from increase to decrease and decrease to increase as needed.

Figure 2:
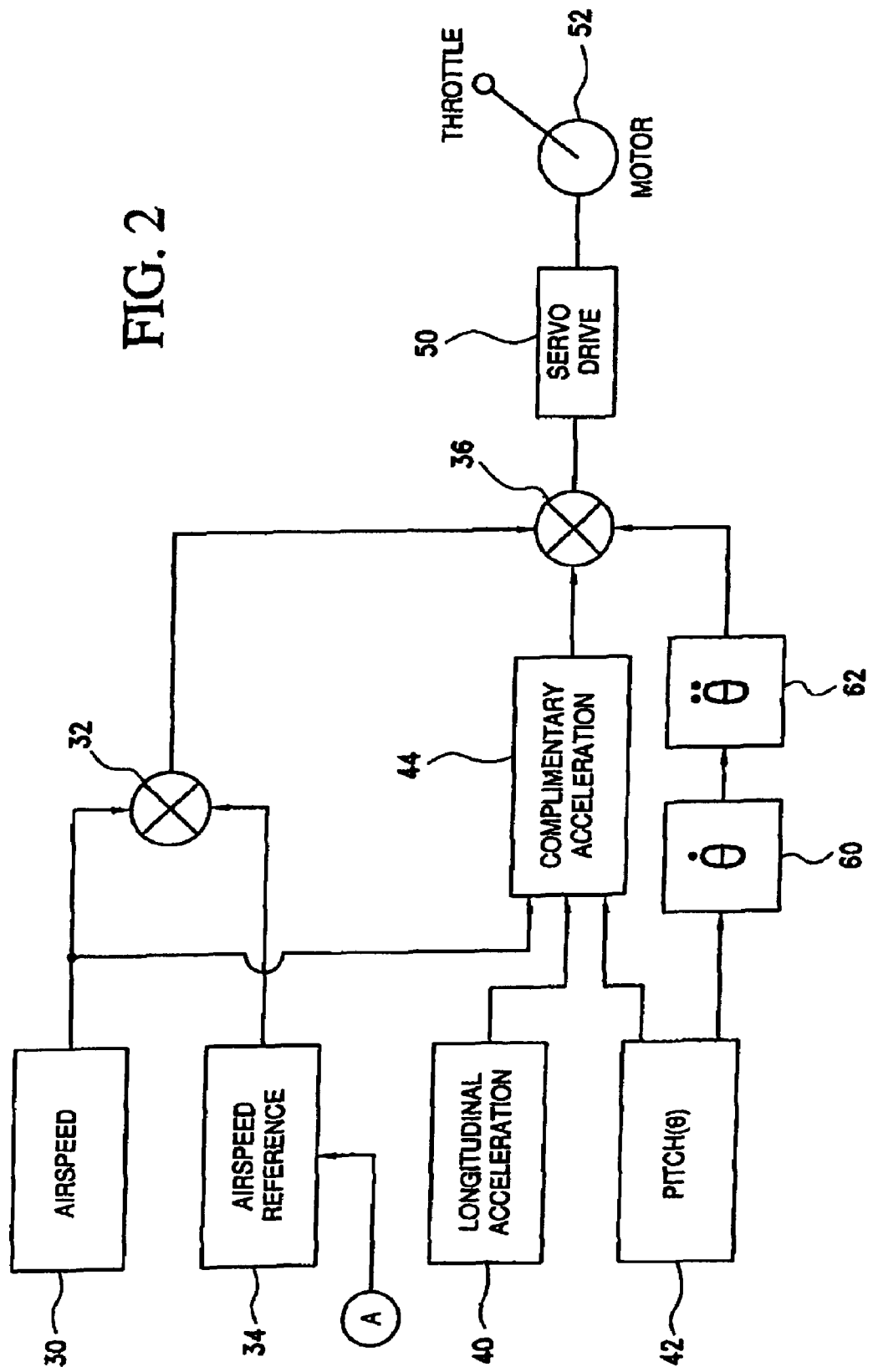
FIG. 2 is a schematic block diagram which illustrates a second embodiment of the invention

FIG. 2 illustrates a modification to an auto throttle system as disclosed in the U.S. Pat. No. 6,819,266 which is assigned to Safe Fight Instruments Corporation. As illustrated in FIG. 2, an airspeed indicator 30 of a conventional design generates a signal indicative of the airspeed of the aircraft and feeds the signal to a summing circuit 32. An airspeed reference signal is input into the computer input 34 by means of the input A and this signal is fed to the summing circuit 32. A longitudinal accelerometer 40 produces a signal which is combined with a signal from a pitch indicator 42 and the airspeed indicator 30 to produce a complimentary acceleration signal as indicated by a box 44.

The complementary acceleration signal is fed to the summing circuit 36 and an output signal is fed to a servo drive 50. The servo drive 50 then activates a motor 52 to increase or reduce the thrust as needed. The system also includes means for generating a signal indicative of the rate of change of pitch 60 and a second derivative 62 as an indication of the rate of change of the rate of change of pitch. The latter signal being fed to the summing circuit 36 to provide compensation for mountain waves.

In considering the present invention, it is important to recognize that the vertical spacing of aircraft as for example in opposing aircraft traffic is based on barometric spacing. The determination to use barometric spacing assumes that even if a barometer is an error a second aircraft would have the same error. Thus, there is a risk of collision and that risk is exacerbated by the increase in air traffic and by the much larger size of today's and tomorrow's aircraft.

In mountainous areas, there is a series of linked disturbances where airflow osculates up and down for a relatively long period. The period is relatively long since there is nothing to dampen it. Further, during the period of time you may have reached or exceeded the performance limits of an aircraft. Therefore, the aircraft may not adequately compensate for a mountain wave. For example, if you envision a tsunami or cresting wave, you can visualize that the amount of energy to change the height of an aircraft would be beyond an aircraft's ability to compensate for such a wave. Thus, if you used all of the available power that's on the aircraft to go up and it isn't enough there is no way to solve that power equation. In essence, it will simply lag off on airspeed to borrow it from a kinetic energy bank to try and make the contours of the wave. Unfortunately, this is not a rare occurrence. In fact, it is to be expected. It is also to be expected that in flying mountain waves that the aircraft will not be able to stay on speed and will not be able to track the barometric path that is prescribed by anti-collision considerations. Further, if you allow the speed to fall off, you could develop further problems with disturbances which could build up.

Under such circumstances, the very best that a pilot could do would be guess at what amount of power to use. As for example, something in the middle of an average or something like that. Under any circumstances you can not be certain that a barometric pressure is going to prevent a collision. The problem will be considerably worse in considering an 800 passenger aircraft which will use practically all of the space between aircraft leaving no tolerances for error. The result is that you have a system that you cannot analyze on paper as being safe. When one encounters a mountain wave you can differentiate the pitch of the aircraft and make it the pitch rate of the aircraft and then you can go beyond that to differentiate it again to have the pitch jerk of the aircraft. The advantage of doing this is that you are deliberately throwing out half of the cycle of the information to prevent the aircraft from chasing these waves to the full cycle because the full cycle will now get you deeper into trouble and thus it is that jerk allows you to cut off half of the cycle. The result is that you have jerk which is only intended to be part of the wave. However, the combined total of all of this is the best preventive solution you can have with unknowns of inadequate control and power to actually follow the pressure wave. Now when they came forward with barometric flying they hadn't fully anticipated all of this and some of the problems have gotten bigger.

It is also important to recognize that it is not possible to fly an aircraft at a constant barometric pressure or any other constant. However, if you have a splitter that splits with jerk it gives you the best half of each side of an equation and that is what the equipment in accordance with the present invention does. In the present case, you have a very smart splitter because it solves the first half of a problem and then shuts off. What the present invention provides is that jerk is available to determine when it should be on and when it should be off. It is following a middle road which makes sense since it provides a more comfortable ride and the best protection in maintaining adequate separation from another aircraft.

Further, when one flies an aircraft through mountain waves they are at the entrance of a wind shear development. In other words, you have an aircraft pointed upward but losing altitude. This is like entering a micro burst except that a mountain wave cuts off. Nevertheless, the equipment could be used to sound a wind shear alarm. This is merely an illustration of a dynamic function.

While the invention has been described in connection with its preferred embodiments it should be recognized that changes and modifications may be made therein without departing from the scope of the appended claims.

What is claimed is:

1. An automatic throttle control system with mountain wave compensation, said system comprising:
    an auto throttle control including a first computer configured to generate a first signal to automatically control the thrust of an aircraft engine;
    a pitch indicator configured to determine the pitch of an aircraft;
    a second computer configured to determine the first and second derivatives of pitch and for generating generate a second signal indicative of the second derivative of the pitch signal;
    a summing circuit configured to combine said first and second signals to produce a combined signal; and
    a servo assembly and motor configured to adjust the thrust of the aircraft's engine in response to said combined signal.

2. An automatic throttle control system with mountain wave compensation, said system comprising:
    a servo and motor configured to adjust a throttle of an aircraft;
    a first computer configured to generate a first signal indicative of a difference between a pre-selected airspeed of an aircraft and the actual airspeed of an aircraft;
    a pitch indicator configured to determine the pitch of the aircraft and generate a second signal indicative of the pitch of the aircraft;
    a second computer configured to determine the rate of change of pitch and generate a third signal indicative of the rate of change of pitch and to determine the rate of change of the rate of change of pitch and generate a fourth signal indicative of the rate of change of the rate of change of pitch; and
    a summing circuit configured to combine the first and fourth signals to produce a combined signal and feed said combined signal to said servo to increase, maintain, or reduce the thrust of the aircraft's engine.

3. An aircraft throttle control system for controlling the thrust of an aircraft engine, said system comprising:

an airspeed indicator configured to measure the actual airspeed of an aircraft and generate an actual airspeed signal;

a first summing circuit configured to compare the actual airspeed of the aircraft and a pre-selected airspeed and generate a difference signal indicative of the difference between the actual airspeed of the aircraft and the pre-selected airspeed;

a pitch indicator configured to determine the pitch angle of the aircraft;

a configured to generate a signal indicative of the rate of change of the rate of change of pitch angle and generate a signal indicative of the rate of change of the rate of change of pitch;

a second summing circuit configured to combine said difference signal and said signal indicative of the rate of change of the rate of change of pitch and generate a compensating signal; and a servo drive and motor configured to adjust the thrust of the aircraft engine in response to changes in said compensating signal to thereby compensate for mountain waves.

4. An aircraft throttle control system according to claim 3 wherein the system is configured to continuously monitor the second summing circuit.

5. A method for compensating an auto throttle for mountain waves comprising the steps of:

providing an auto throttle system and generating a signal indicative of the difference between a pre-selected airspeed and actual airspeed of an aircraft;

indicating the pitch angle of the aircraft and generating a signal indicative of the second derivative of the pitch angle of the aircraft; and combining the signal indicative of the second derivative of the pitch angle of the aircraft and the signal indicative of the difference between a pre-selected airspeed and an actual airspeed to thereby provide a compensated auto throttle which is compensated for mountain waves.

6. A method according to claim 5 in which said compensated auto throttle drives a servo and motor to advance and retard a throttle.

* * * * *

UNITED STATES PATENT AND TRADEMARK OFFICE
CERTIFICATE OF CORRECTION

PATENT NO. : 8,024,080 B2  Page 1 of 1
APPLICATION NO. : 12/146616
DATED : September 20, 2011
INVENTOR(S) : Leonard M. Greene It is certified that error appears in the above-identified patent and that said Letters Patent is hereby corrected as shown below:

In the Claims:

At column 4, claim 1, line 38, after "second derivatives of pitch and" please delete "for generating"

At column 5, claim 3, line 11, between "a" and "configured" please insert --computer--

Signed and Sealed this
Fifteenth Day of November, 2011

David J. Kappos
*Director of the United States Patent and Trademark Office*